D. S. BURKHART.
GOVERNOR.
APPLICATION FILED DEC. 12, 1914.

1,165,842.

Patented Dec. 28, 1915.
2 SHEETS—SHEET 1.

Witnesses
Harold Scantlebury
Edna Broyles

Inventor
Daniel S. Burkhart
By
Herbert E. Smith
Attorney

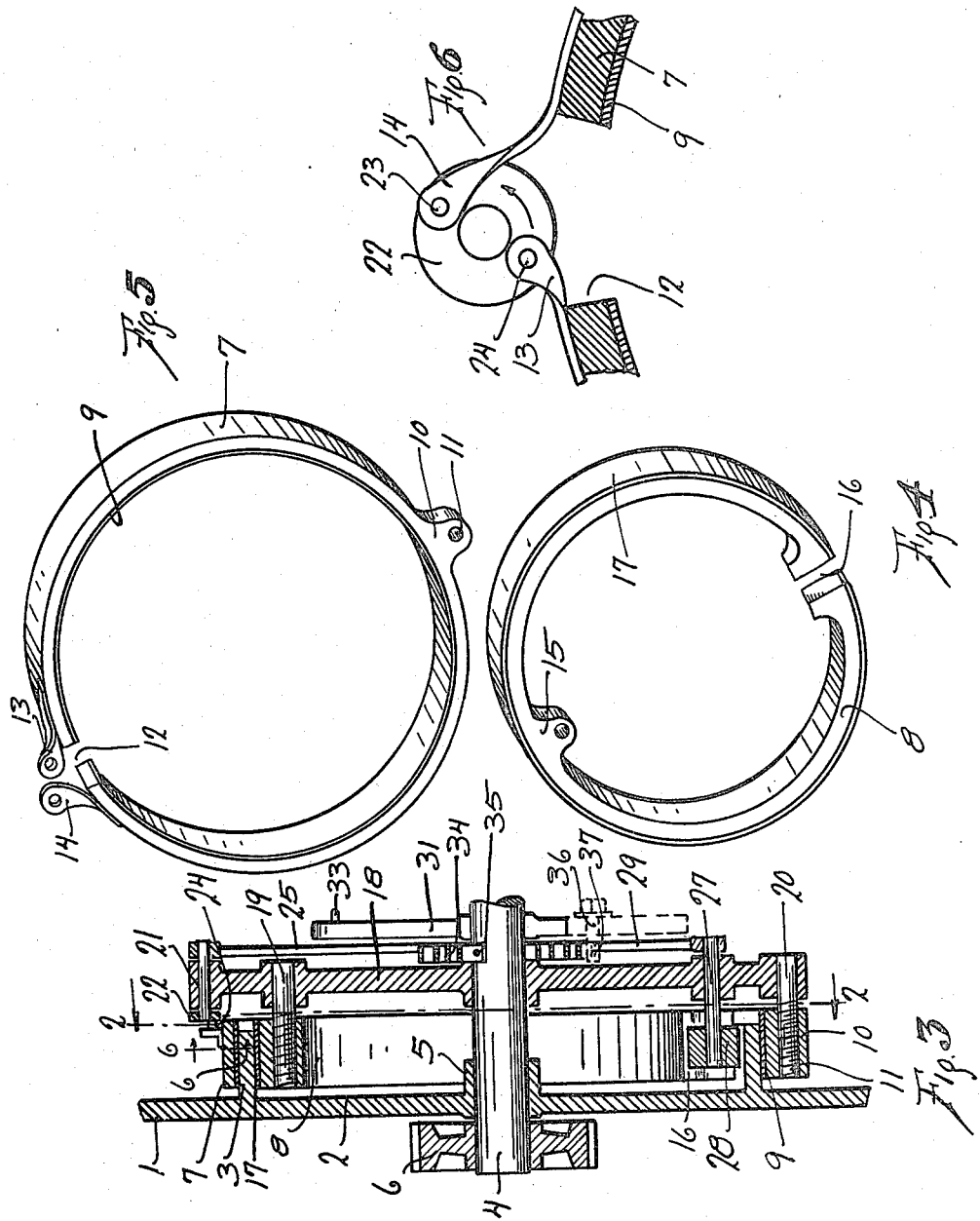

UNITED STATES PATENT OFFICE.

DANIEL S. BURKHART, OF SPOKANE, WASHINGTON.

GOVERNOR.

1,165,842.             Specification of Letters Patent.       Patented Dec. 28, 1915.

Application filed December 12, 1914. Serial No. 876,996.

*To all whom it may concern:*

Be it known that I, DANIEL S. BURKHART, citizen of the United States, residing at Spokane, in the county of Spokane and State of Washington, have invented certain new and useful Improvements in Governors, of which the following is a specification.

This invention relates to improvements in governors and the device of the present invention is designed and intended more particularly as a governor for fire escapes of the endless type, although the device of my invention is not limited to this utility.

It is one of the objects of this invention to provide a fixed friction member, which may be in the form of a ring, with a plurality of faces against which is adapted for coaction a plurality of friction elements, the latter being actuated for braking action centrifugally, and released by means such as a spring.

In the most preferred embodiment of the invention, the friction member is in the form of a ring against which expansible and contractible friction bands are adapted to act, centrifugal devices being provided for actuating said bands.

Further objects and features of the invention will be more fully described in connection with the accompanying drawings and will be more particularly pointed out in and by the appended claims.

Figure 1:
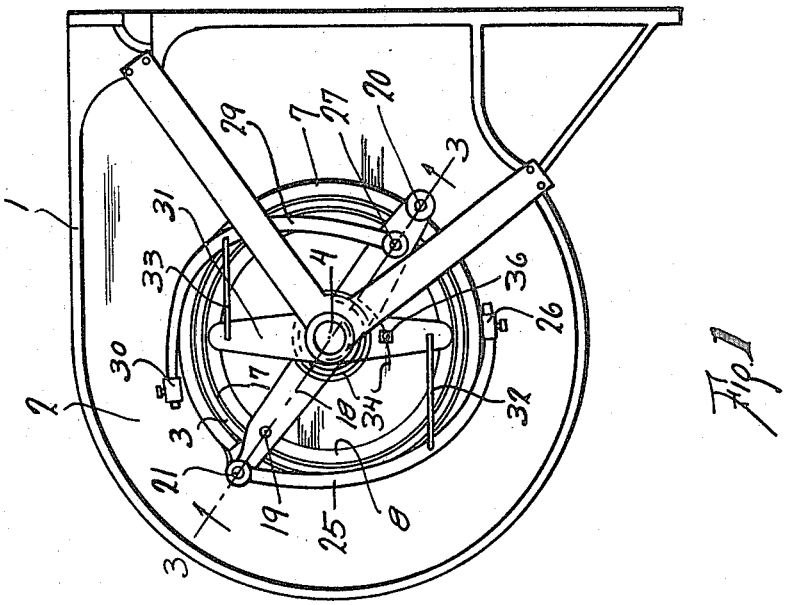
Figure 2:
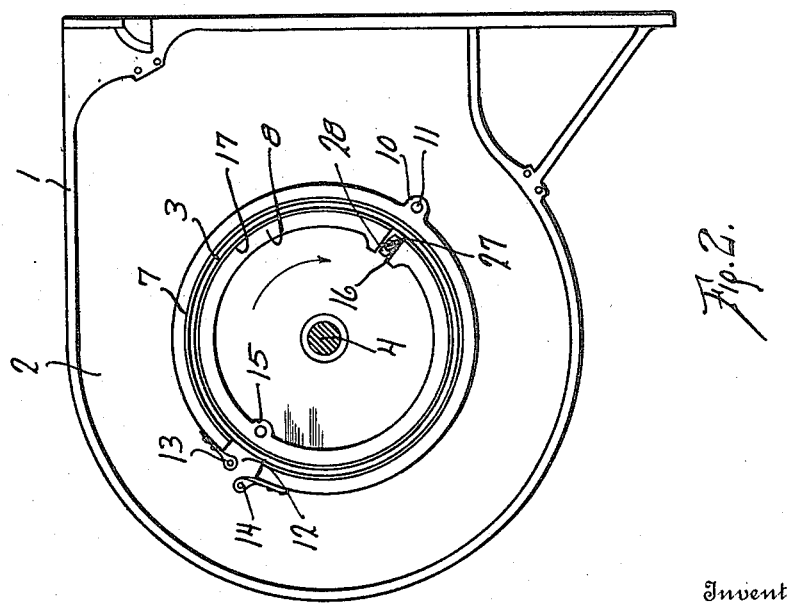

In the drawings:—Figure 1 is a view in elevation of one embodiment of my invention; Fig. 2 is a sectional view on line 2—2 of Fig. 3, with the casing in elevation; Fig. 3 is a sectional view on line 3—3 of Fig. 1; Fig. 4 is a perspective view of an internal friction member; Fig. 5 is a perspective view of an external friction member; Fig. 6 is a sectional view on line 6—6 of Fig. 3.

Like characters of reference designate similar parts throughout the different figures of the drawings.

When the device of my invention is embodied in a fire escape structure, a casing is employed and is indicated as a whole at 1. The casing is adapted to be incorporated in the fire escape structure in any desirable manner and includes a side wall 2 on which I desirably form a friction ring 3 having exterior and interior annular friction faces. The friction ring 3 is concentrically disposed about a driven shaft 4 which latter is suitably journaled in a bearing 5. The shaft 4 is provided with a gear 6 which may be connected in any manner with the fire escape structure to be driven thereby, and which, if the device is operated for controlling any other kind of mechanism, will be connected therewith as a driven shaft.

The friction ring 3 is stationary, and in connection therewith I employ revolving friction elements, one thereof being a contractible exterior friction band 7, and the other being an interior expansible friction band 8. On the acting face of the exterior band 7 I may dispose fiber 9, or a like material of a high tractive coefficiency for engagement with the exterior face of ring 3. The band 7 is provided with a lug 10 having a threaded bore 11, and opposite said lug 10, the band is split at 12, the split ends having apertured contracting lugs 13 and 14.

The internal band 8 is provided with a holding lug 15, and directly opposite said lug 15, the band 8 is split at 16. I likewise peripherally cover the interior band 8 with fiber or like material, as indicated at 17.

A carrier arm 18 is fixed upon the driven shaft 4 and is bored to receive a positioning pin 19 having a threaded end adapted for engagement with interior threads of lug 15 thereby holding the band 8 relatively fixed with respect to carrier arm 18 and in close proximity to the interior of ring 3. Said carrier arm 18 is bored to receive a pin 20 which is threaded into lug 10 for the purpose of holding the outer band 7 in close proximity to the outer face of ring 3. From the foregoing it will be seen that the split ends of the bands 7 and 8 are diametrically disposed and I will now describe the manner in which, and the means by which the bands are actuated.

A spindle 21 is journaled in one end of the carrier arm 18 and carries on one of its ends a disk 22. The disk 22 is provided with studs 23 and 24 which are inserted in the apertures of tightening lugs 14 and 13, respectively. On the remaining end of spindle 21 is fixed a centrifugally acting arm 25 on the free end of which is an adjustable weight 26. During revolution of the arm 25, with its connected parts, the weight 26 will tend to move radially outwardly thereby turning the disk 22 in a contra-clockwise direction, as regards Fig. 6, and in a clockwise direction, as regards Fig. 1. This rotative adjustment of disk 22 will advance the split ends toward each other and contract the band 7 on the ring 3 thereby initiating frictional resistance to rotation of shaft 4.

A cam spindle 27 is journaled in carrier arm 18 and is provided on one end with a cam 28 which is disposed between the split ends 16, of band 8, and which is so shaped that when it is in one position, the band 8 will be permitted to assume a normal contracted position, while when the cam 28 is rotated to a tightening position it will act against the split ends 16 to expand the band 8 against the ring 3. On the opposite end of spindle 27 is a centrifugal arm 29 on the free end of which is an adjustable weight 30. As will be seen by reference to Fig. 1, the arms 25 and 29 are curved so that their weights will tend to swing the arms in a manner to rotate spindles 21 and 27.

It is not the intention of my device to bring the fire escape to a position of rest but merely to retard its speed under the weight of its occupants to a reasonable speed decided upon and therefore it is a feature of my invention to quickly and positively release friction or braking action as soon as speed has been reduced, and I will now describe the releasing means for performing this function.

An arm 31 is loosely mounted on spindle shaft 4 and its ends are connected with governor arms 25 and 29 by links 32 and 33. Arm 31 is also operatively connected with shaft 4 so that it will normally be held in predetermined relation with carrier arm 18. The means for performing this function is shown in the form of a clock-like spring 34. One end of said spring is secured to shaft 4, as indicated at 35, and the remaining end is adjustably secured to releasing arm 31. Such connection may be effected by a threaded bolt 36 having a slotted end 37 whereby the spring may be clamped against 31 and held in position thereagainst to maintain the spring at the desired tension. The spring 34 will act to rotate releasing arm 31 and to always maintain the latter about in the relation shown in Fig. 1, to carrier arm 18. When the governor arms 25 and 29 swing outwardly to shift the friction bands into engagement with friction ring 3, the links 32 and 33 will move arm 31 slightly out of the relation shown in Fig. 1, with respect to arm 18, and this movement of arm 31 will be resisted by spring 34 thereby placing the latter under tension. When the speed of the fire escape or other governed device is sufficiently reduced so that the governor arms will no longer seek an outward position, then tension on the spring 34 will be released and the spring 34 will shift arm 31, and act through links 32 and 33 to return governor arms 25 and 29 to a radially inward position. This will release the friction bands and permit of advancing movement of the fire escape at normal speed.

Of course it will be understood that the load on a fire escape will vary and that in operation there will be a constant alternate gripping and releasing action on ring 3 by bands 7 and 8.

The device of my invention affords a maximum gripping area and the arrangement shown also permits of an instantly responsive action on the part of the friction devices.

It is believed that the advantages and utility of my invention will be clearly understood from the foregoing description, and while I have herein shown and described one specific form of my invention, I do not wish to be limited thereto except for such limitations as the claims may import.

I claim:—

1. In a governor of the class described, a driven shaft to be governed, a relatively fixed friction ring having interior and exterior friction faces concentrically disposed about said shaft, an external contracting brake band for said exterior face, an interior expansion brake band for said interior face, a carrier fixed on said shaft and connected with said brake bands to hold the latter in close proximity to said ring and advance the bands with said shaft, centrifugally acting devices one for contracting the external band and one for expanding the internal band both being carried by said carrier arm, a releasing arm loosely mounted on said shaft and connected with said devices, and a spring connected with said shaft and releasing arm to impart band-releasing movement to the latter, substantially as described.

2. In a governor of the class described, a driven shaft to be governed, a relatively fixed friction ring having interior and exterior friction faces, exterior and interior friction bands for engagement with said faces, respectively, means carried by said shaft and connected with said bands to rotate the latter with said shaft, centrifugally acting devices for gripping said bands against said ring, and a spring actuated device connected with said shaft and normally acting to release action of said bands against said ring, substantially as described.

3. In a governor of the class described, a driven shaft to be governed, a relatively fixed friction ring, friction devices for engaging said ring, means carried by said shaft and connected with said friction devices for rotating the latter with said shaft, centrifugal devices rotatably mounted in said means for gripping said devices against said ring, and a spring actuated device connected with said shaft normally acting to impart releasing movement to said devices, substantially as described.

4. In a governor of the class described, a driven shaft to be governed, a relatively fixed friction ring, friction devices rotatable with said shaft for engaging said ring, means for engaging said friction devices with said ring, and spring actuated means rotatable on said shaft and also therewith and normally acting to release said friction devices from said ring, substantially as described.

5. In a governor of the class described, a driven shaft to be governed, a relatively fixed friction ring, interior and exterior friction bands for engagement with said ring, an arm fixed on said shaft, devices carried by said arm, one for each band for gripping the same against said ring, a releasing arm loosely mounted on said shaft, links connecting said arm with said devices, and a clock-like spring fixed to said shaft at one of its ends and having its other end adjustably connected with said releasing arm to impart releasing movement thereto, substantially as described.

In testimony whereof I affix my signature.

DANIEL S. BURKHART.

Copies of this patent may be obtained for five cents each, by addressing the "Commissioner of Patents, Washington, D. C."